April 13, 1937. O. C. BUMPAS ET AL 2,077,308
TERRACE OUTLET
Filed Jan. 14, 1936 2 Sheets-Sheet 1

←TERRACE CREST

Inventors
O. C. Bumpas
W. J. Mills
By Clarence A. O'Brien and
Hyman Berman
Attorneys

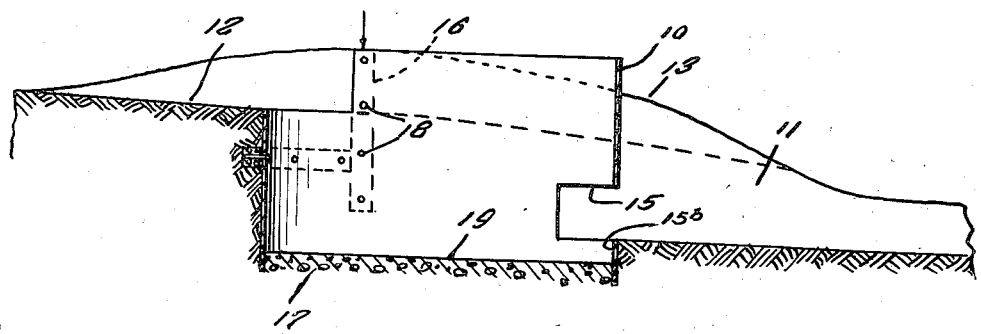
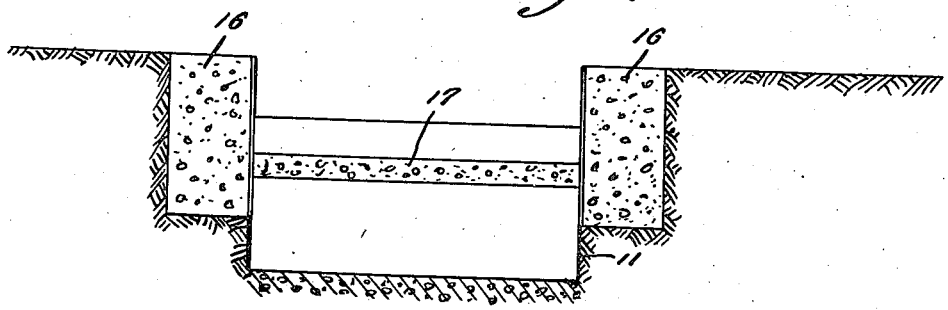
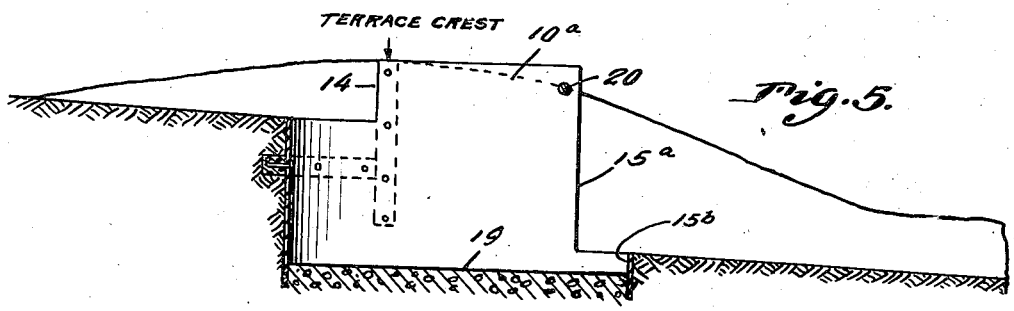

Patented Apr. 13, 1937

2,077,308

UNITED STATES PATENT OFFICE 2,077,308

TERRACE OUTLET

Orville C. Bumpas and William J. Mills, Braden, Tenn.

Application January 14, 1936, Serial No. 59,146

2 Claims. (Cl. 61—18)

This invention relates broadly to agricultural terracing with controlled run-off, the invention being concerned primarily with the provision of means whereby during excessive rains and when the terraces can no longer absorb and retard the run-off the surplus water in one terrace may be let down to the level of the succeeding terrace in a manner to prevent erosion.

Briefly the invention consists in the provision of an outlet drum which can be readily set in an excavation in one terrace and so arranged that excess water in that terrace may "spill" through the drum to the next succeeding terrace or to any safe level as will preclude the occurrence of erosion.

Further the invention consists in the provision of novel means for anchoring the outlet or spillway in position.

The invention together with its objects and advantages will be best understood from a study of the following description taken in connection with the accompanying drawings, wherein:

Figure 3 is a detail view taken substantially on the line 3—3 of Figure 1.

Figure 4 is a detail view of the excavation with the outlet removed and

Figure 5 is a view similar to Figure 3 illustrating a slightly modified form of the invention.

Figure 1:
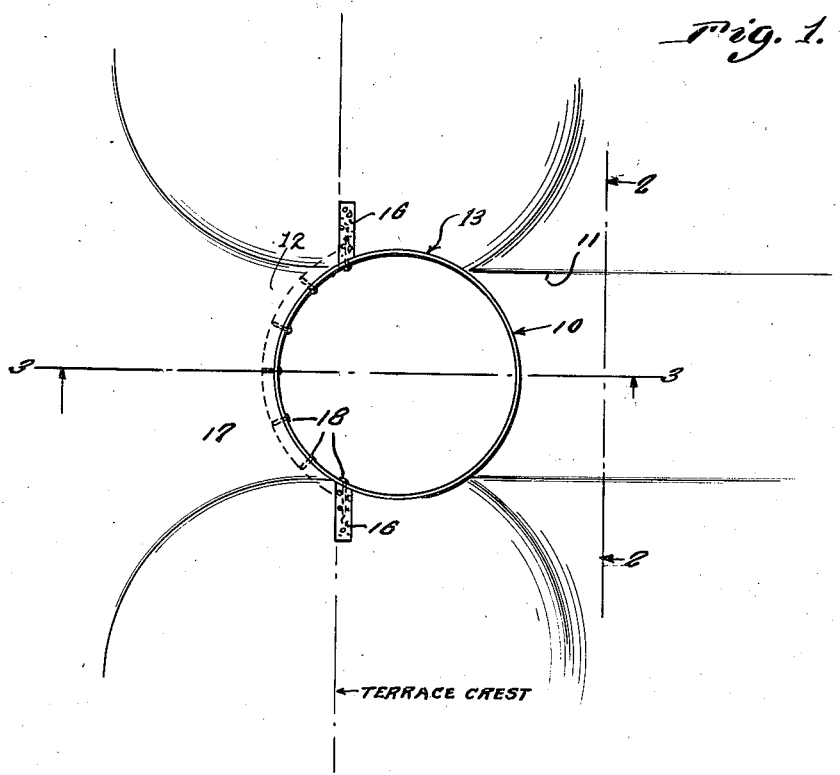
Figure 1 is a top plan view illustrating an application of the invention.

Referring to the drawings by reference numerals it will be seen that in the preferred embodiment the terrace outlet or spillway indicated generally by the reference numeral 10 is in the form of a cylinder or drum, constructed preferably of metal and adapted to fit within an excavation suitably provided in the crest of a terrace, indicated generally at 13, and at the junction of the run-off channel or spillway 12 leading from the next preceding upper terrace, and the spillway or run-off channel 11 for the terrace 13 and leading to the next succeeding lower terrace outlet.

As shown the drum 10 has an upper edge portion of its wall removed as at 14 to provide an inlet through which the water from the run-off channel or spillway 12 enters the drum 10.

Figure 2:
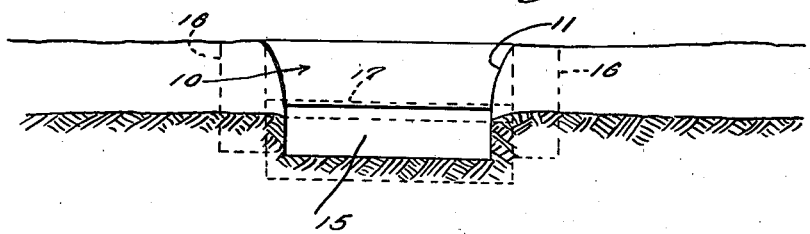
Figure 2 is a view further illustrating the invention, and taken substantially on line 2—2 of Figure 1.

Also in the form of the invention shown in Figures 1 to 3 inclusive the drum 10 has adjacent the lower edge portion of its wall a part removed as at 15 so as to provide an outlet through which the water from the drum 10 passes into the run-off channel or spillway 11. In this connection it will also be noted that below the outlet 15 the peripheral wall of the drum 10 forms a substantially arcuate baffle 15b which gives to the drum 10 the tendency to function as a "still" basin, thereby retarding to a material extent the flow of the water and the consequent force thereof, all of which tends to prevent soil erosion.

Further in accordance with the present invention the drum 10 is anchored within the excavation provided therefor through the medium of poured or run-in place concrete anchoring blocks 16 set into the crest (properly indicated) of the terrace, and also through the medium of a poured or run-in place arcuate concrete slab 17 which is disposed concentric to the drum 10 and extends from one slab 16 to the other. Reinforcing steel or other suitable fastening devices are employed for positively securing the drum 10 to the blocks 16 and slab 17, such fastening devices being indicated generally at 18.

After the drum 10 has been properly positioned within the excavation provided therefor a concrete floor or "apron" 19 for the drum is poured. In actual practice the apron 19 will extend to a depth of from three to four inches within the drum 10 to serve as a reinforcement for the drum and an additional anchorage means therefor.

It will be apparent from the foregoing that with the drum 10 thus positioned and anchored in place, surplus water, resulting for example, from excessive rains, from the next uppermost terrace will flow through the run-off channel 12 into the drum 10 through the opening 14 in the outlet, and from the drum 10 will flow through the opening 15 of the drum into the run-off channel 11 to be directed or carried away to the level of the next succeeding terrace or to any safe level where soil erosion will not occur.

It will be further understood, that in actual practice, each terrace may be provided with a desired number of drums 10, and that the drums 10 will progressively increase in diameter in the order of descent of the terraces so that, for example the drums of smallest diameter will be in the upper terrace and the drums of greatest diameter will be in the lowermost terrace. Thus the size of the drums regardless of design, increases directly in proportion to the increase in run-off acres.

An advantage of terrace drum structures involving the features of the present invention is that the drums 10 can be formed in any place remote from the terraces thus obviating the necessity of building the drums at the place or point of use as is now required where concrete or similarly constructed outlets are employed.

Further the drums 10 being of various diameters they can be transported economically in that a number of such drums may be nested one within the other thus requiring but small storage space.

In Figure 5 a slightly modified form of the invention is shown, this form of the invention differing from the form shown in Figures 1 to 3 inclusive only in that at the downstream side of the terrace the drum 10a has the major portion of its peripheral wall removed so as to provide a larger discharge opening 15a. At the opening 15a opposed portions of the peripheral wall of the drum 10a are braced with respect to one another through the medium of a brace rod 20. In all other respects the drum 10a is similar in construction to the herein described drum 10.

It is thought that from the foregoing a clear understanding of the construction, utility and advantages of the invention will be had.

Having thus described the invention, what is claimed as new is:

1. In agricultural terracing, a terrace outlet by carrying off the surplus water of a terrace to the level of the next succeeding terrace, said outlet comprising a substantially cylindrical drum adapted to be anchored in an excavation in the terrace and having a portion of the upper edge of its peripheral wall cut away to form an inlet for the drum, and at a diametrically opposite point in its periphery adjacent its bottom an outlet from the drum, whereby the excess water from the terrace will spill into the drum through the inlet of the drum and pass from the drum through the outlet of the latter to the next succeeding terrace or ground level.

2. In agricultural terracing, a terrace outlet for carrying off the surplus water of a terrace to the level of the next succeeding terrace, said outlet comprising a substantially cylindrical drum adapted to be anchored in an excavation in the terrace and having at one point in its periphery and adjacent its upper edge an inlet for the drum, and at a diametrically opposite point in its periphery and adjacent its bottom an outlet for the drum, and a baffle formed by the peripheral wall of the drum below the outlet, whereby the flow of water passing from the outlet is retarded.

ORVILLE C. BUMPAS.
WILLIAM J. MILLS.